United States Patent [19]

Grataloup

[11] 4,029,235
[45] June 14, 1977

[54] ONE-BY-ONE PNEUMATIC SEEDER

[75] Inventor: Xavier Roger Grataloup, Montereau, France

[73] Assignee: Nodet-Gougis, France

[22] Filed: Mar. 15, 1976

[21] Appl. No.: 666,969

[30] Foreign Application Priority Data

Mar. 27, 1975  France .............................. 75.09766

[52] U.S. Cl. .............................................. 221/211
[51] Int. Cl.² ........................................ A01C 7/04
[58] Field of Search ............. 221/211, 156; 111/34

[56] References Cited
UNITED STATES PATENTS

| 2,991,909 | 7/1961 | Lamazou et al. | 221/211 |
| 3,209,888 | 10/1965 | Sterling | 221/211 X |

Primary Examiner—Stanley H. Tollberg
Attorney, Agent, or Firm—Diller, Brown, Ramik & Wight

[57] ABSTRACT

A one-by-one pneumatic seeder with a seed dislodging member. A rotary seed dispenser disc defining a wall of a seed hopper has a perforate annular zone with an array of equidistant holes concentric with the axis of rotation of the dispenser disc. The annular zone rotates relative to the dislodging member which is disposed juxtaposed to the dispenser disc and gradually approaches, though never crossing the circle defined by the centers of the holes in the annular zone. A part circular suction chamber is disposed on the side of the dispenser disc opposite the dislodging member, the forward end of the suction chamber relative to the direction of rotation of the dispenser disc substantially coinciding with the portion of the dislodging member closest to the circle of hole centers. The seeds are thus gradually rocked by the dislodging member and loosened before arriving at the forward end of the suction chamber where they are released eventually by the cutting off of suction. The dislodging member may be curved, flat or even cylindrical, perpendicular or otherwise angled to the plane of the dispenser disc, and entirely radially inwardly or outwardly of the circle of hole centers.

13 Claims, 23 Drawing Figures

FIG.2
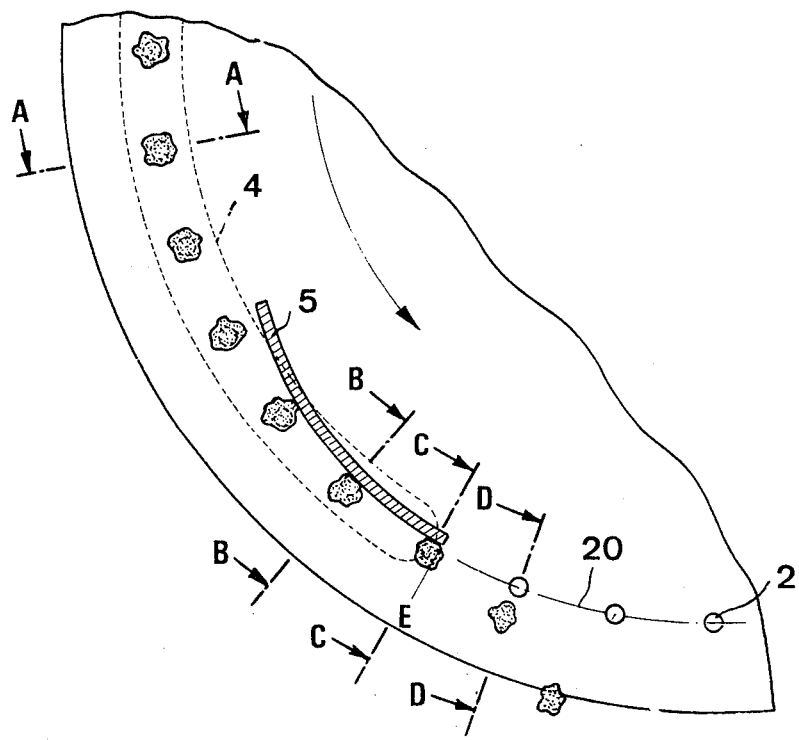
FIG.2a  FIG.2b  FIG.2c  FIG.2d
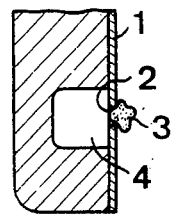 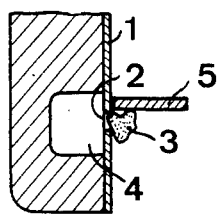 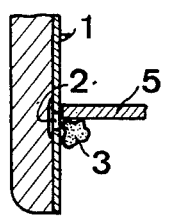 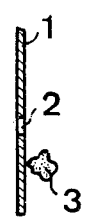

FIG.3
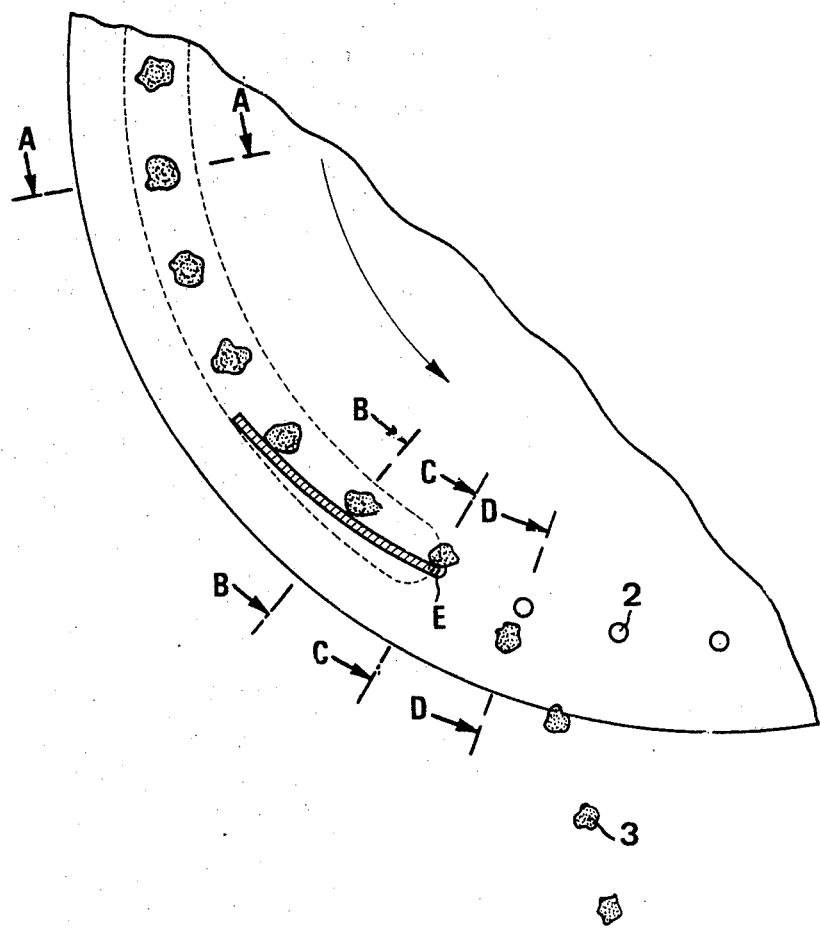
FIG.3a  FIG.3b  FIG.3c  FIG.3d
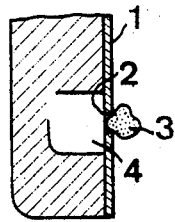 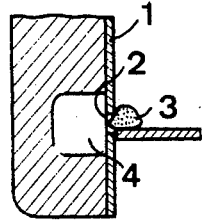 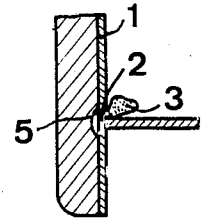 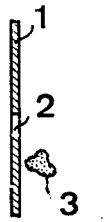

FIG.4
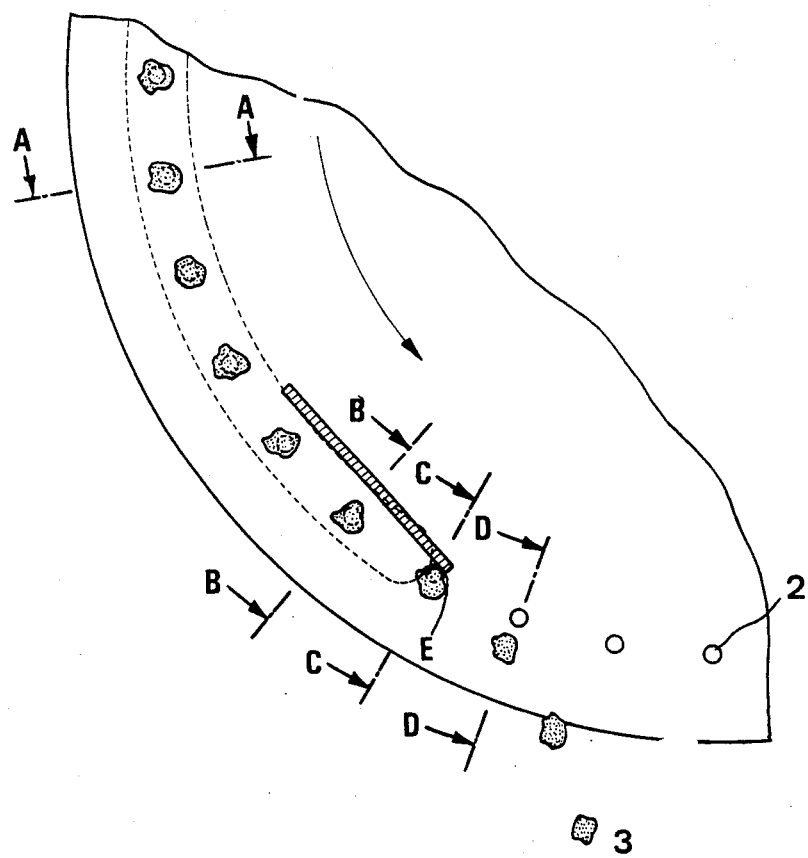
FIG.4a  FIG.4b  FIG.4c  FIG.4d
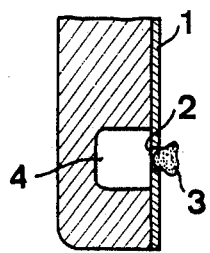 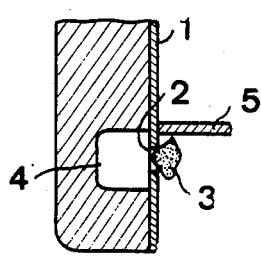 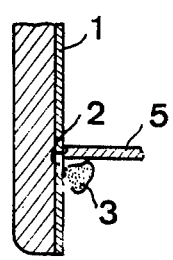 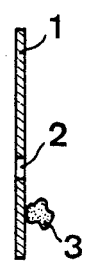

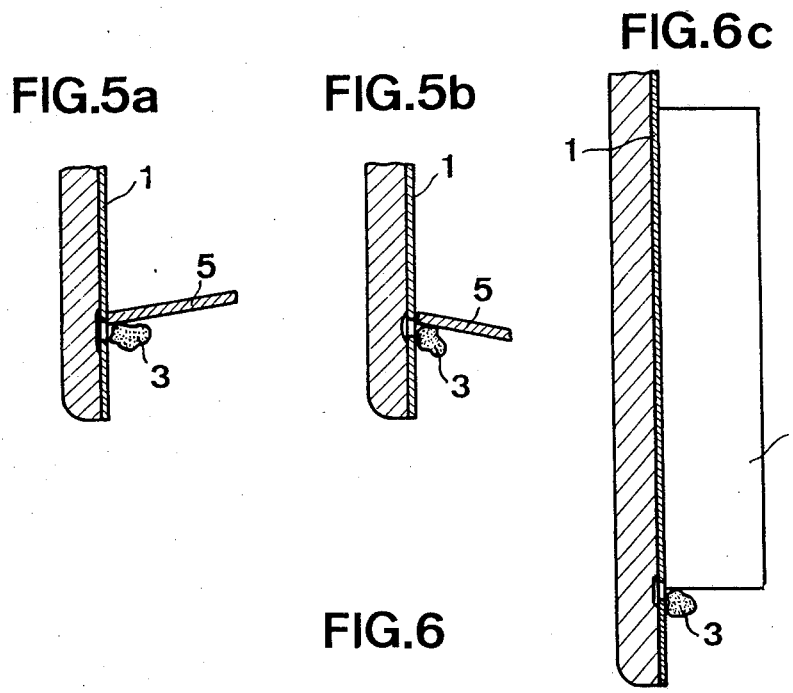

ONE-BY-ONE PNEUMATIC SEEDER

The present invention relates to one-by-one pneumatic seeders with seed ejection means.

Most one-by-one mechanical seeders are provided with seed ejection means for ejecting the seeds from seed dispenser recesses. Such seed ejection means comprise a wedgelike member extending across the circular path of movement of the seeds, radially inwardly and outwardly thereof, for ejecting seeds from recesses in the dispenser member.

In pneumatic seeders, suction is applied along part of the path of the perforate surface of the dispenser member, and if seed ejection means are employed, such as those arranged on mechanical seeders for expelling contorted seeds with protrusions stuck in the holes at the end of suction, this adversely effects the sowing of the seeds and results in very poor seed spacing and alignment in the furrow. In fact, the behavior of seeds in a dispenser member differs entirely depending on whether it is on a mechanical or a pneumatic seeder. In a mechanical seeder the seeds are in dispenser recesses whose volume is adjusted to the size of the seeds, whereas in a pneumatic seeder the seeds are held in perforations in the surface of the dispenser member by a partial vacuum applied on the other side of the dispenser member. Such seeders react differently to the seed ejection means since in a mechanical seeder the action of the ejection means and the force of the dispenser are in the same plane whereas in pneumatic seeders the seeds are held in the plane of the perforations and the action of the seed ejection means is necessarily in a parallel plane offset therefrom. The component of these two forces therefore produces seed trajectories which become more random the more oddly shaped the seeds are.

It is therefore not possible to adapt mechanical seeder ejection means to pneumatic seeders and to obtain good spacing and alignment of seeds in a furrow.

French Pat. No. 73/28563 discloses a pneumatic seeder with a dispensing unit comprising a drum having a perforate side wall, the interior of the drum being in communication with a source of partial vacuum. In this seeder the release of the seeds results from a momentary interruption of the suction and the action of an S-shaped seed ejection member passing across the path of the suction perforations, suction being cut off by a roller rolling on the inner side wall of the perforate drum, obturating the perforations upon its passage. With such a seeder the trajectory of the falling seeds is not natural but forced as the seeds are projected against the ejection member by the rotary dispensing drum; accordingly the seeds are liable to rebound and adopt an undetermined trajectory which renders sowing irregular.

An object of the invention is therefore to provide a one-by-one pneumatic seeder which ensures the regular release of the seeds so that they adopt identical drop trajectories whereby the seeds are regularly sown, with both good spacing and alignment in the furrow.

The one-by-one pneumatic seeder according to the invention comprises a hopper, a rotary dispenser disc defining one wall of the hopper and separating the hopper from a suction chamber, said dispenser disc having a series of equidistant perforations arranged in a circle with the axis of rotary dispenser disc at its center, said suction chamber extending along part of the circular array of perforations beyond which the rotary dispenser disc is subjected to atmospheric pressure on both faces, said rotary dispenser disc immediately juxtaposed and revolving relative to a seed dislodging member, said seed dislodging member being disposed on side of rotary dispenser disc opposite said suction chamber, said dislodging member extending generally along and gradually approaching the circle defined by the centers of said perforations without ever crossing the last mentioned circle, the closest point being located substantially at the point suction is cut off, the spacing between the operative surface of said dislodging member and the last-mentioned circle preferably being adjustable and adapted to the size of the seeds.

Thanks to the use of a seeder whose suction chamber is cut off which rings about a prolonged stoppage of suction along a part of the circle defined by the perforations thereby preventing the seeds from being sucked back to their perforations after their release, it is possible to use a seed dislodging member that operates only before the seed release point and therefore absolutely does not interfere with the drop trajectory of the seed after loosening the seed, the seed dislodging means effectively loosen the seeds and prepares their release so that they are efficaciously released upon interruption or cut off of the suction.

The seed dislodging member gradually rocks the seeds from their suction perforations to put them in an unstable posture just before their release which is obtained by the prolonged cut off of interruption of suction beyond a certain point which so that seeds are not sucked back into their perforations. The assembly of parts cooperates to dislodge the seeds efficaciously and regularly, to permit them to adopt a substantially identical, natural drop trajectory.

Other features and advantages of the present invention will be brought out in the following description of embodiments of the seed dislodging means, given by way of example only, with reference to the accompanying drawings, in which:

FIG. 2 is a fragmentary elevational view of a seed dislodging means according to the present invention mounted on a one-by-one pneumatic seeder having a rotary disc dispenser;

Figure 7:
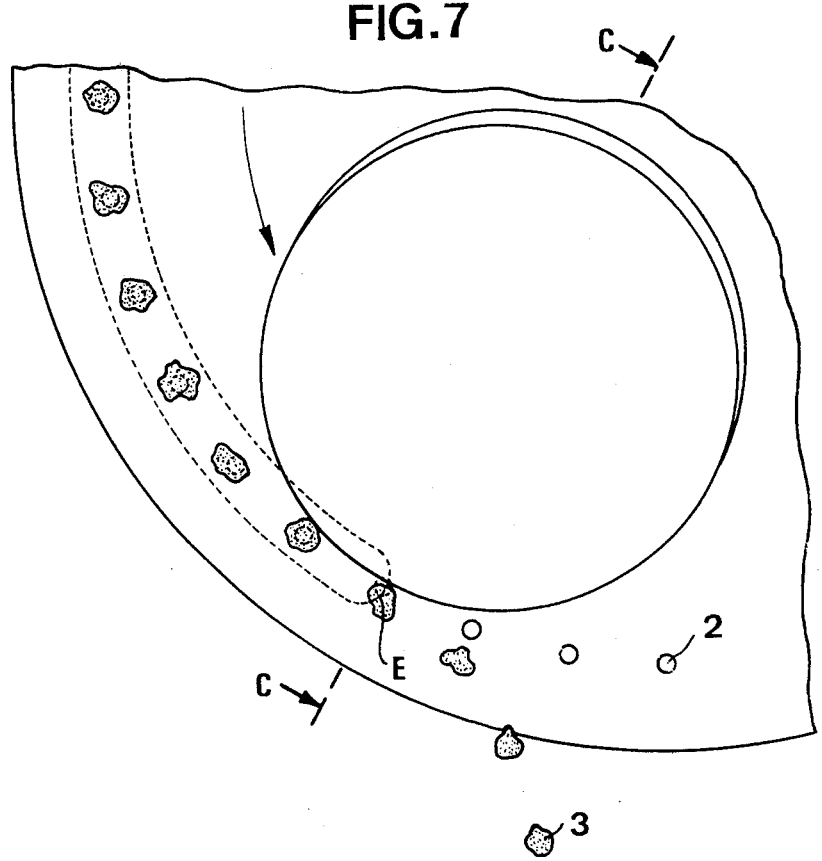
Figure 7C:
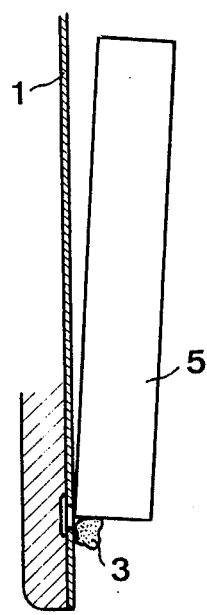

FIGS. 2a, 2b, 2c, and 2d are sectional views taken along lines AA, BB, CC and DD, respectively, in FIG. 2;

FIG. 3 is an elevational view similar to FIG. 2 of another embodiment of the seed dislodging means according to the invention;

FIGS. 3a, 3b, 3c and 3d are sectional views taken along lines AA, BB, CC and DD, respectively in FIG. 3;

FIG. 4 is another elevational plan view similar to FIG. 2 of another embodiment of the seed dislodging means having a planar deflecting surface;

FIGS. 4a, 4b, 4c and 4d are sectional views taken along lines AA, BB, CC and DD, respectively, in FIG. 4;

FIGS. 5a and 5b are sectional views similar to FIGS. 2c, 3c and 4c for two modified arrangements;

FIG. 6 is an elevational view of a still further embodiment of the seed dislodging means according to the invention in which the deflector surface of the seed dislodging means is cylindrical;

FIG. 6c is a sectional view taken along line C—C in FIG. 6;

FIG. 7 is an elevational view of yet another embodiment of the seed ejector according to the invention, in which the deflector surface is cylindrical; and FIG. 7c is a sectional view taken along line C—C in FIG. 7.

Figure 1:
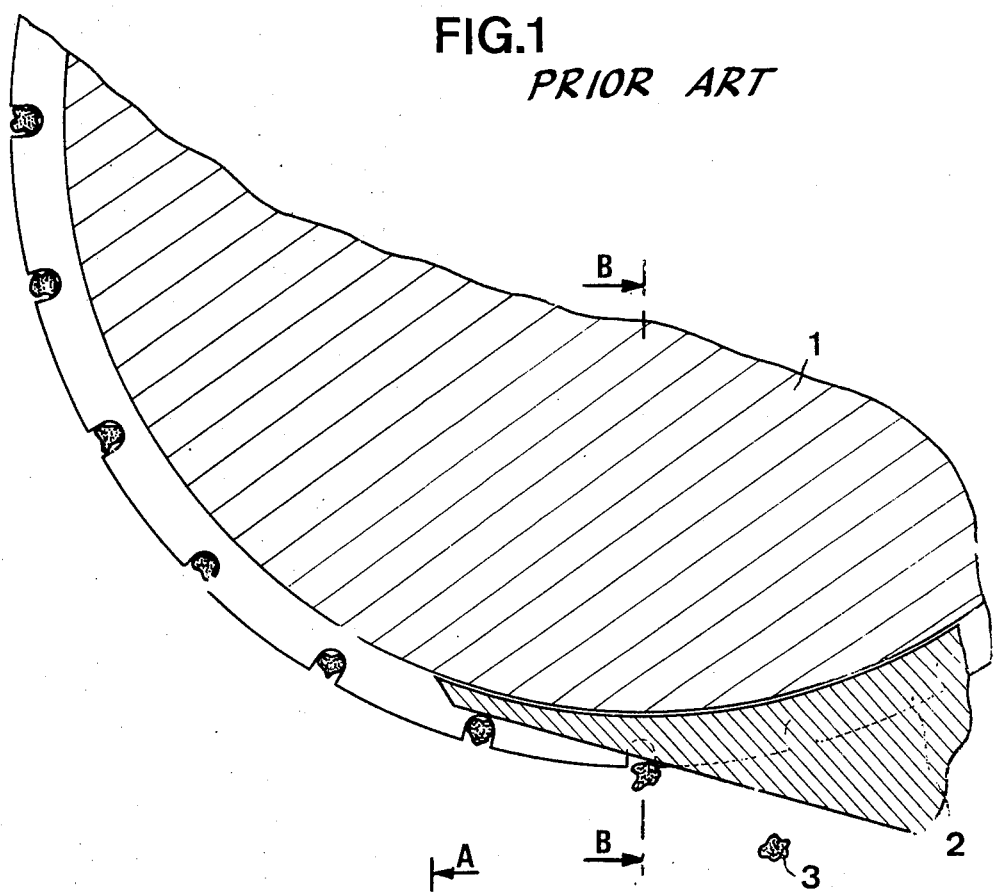
FIG. 1 is a sectional view taken along line A—A in FIG. 2a of a known ejector mounted on a one-by-one mechanical seeder having a rotary disc dispenser.
Figure 1A:
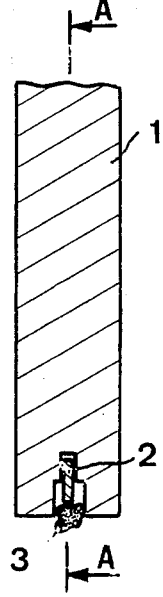
FIG. 1a is a sectional view taken along line B—B in FIG. 1.

In FIGS. 1 and 1a there is illustrated a rotary disc dispenser 1 of known one-by-one mechanical type seeders, the disc dispenser having peripheral recesses whose volume is adjusted to the size of the seeds 3 in order to hold them in place and a wedge-like ejector 2 is provided for dislodging the seeds from their recesses. As represented, the dispenser 1 has a peripheral groove receiving the ejector 2 in order that the ejector may act tangentially in the plane of the disc 1.

In the embodiment shown in FIGS. 2 and 2a through 2d the one-by-one pneumatic seeder with seed dislodging means includes a rotary dispenser disc 1 which constitutes a lateral wall of a seed hopper (not shown) for supplying seeds to be sown. The rotary dispenser disc 1 has perforate annular zone with a circular array of equidistant holes or perforations 2 concentric with the axis of rotation of the dispenser disc, the centers of the perforations or holes 2 defining a circle 20.

Part of the annular zone of the disc dispenser that is provided with perforations 2 is in direct communication with a suction chamber 4 on the face of the disc remote from the seed hopper and from the face where seeds 3 are released. The suction chamber 4 is formed as a part-circular recess the center line of which coincides with the circle 20 of perforation centers. The suction chamber 4 runs along only part of the perforate annular zone of the dispenser disc and does not complete the circle 20 but terminates at a point E relative to the direction of rotation of the dispenser disc which corresponds to the point at which the seeds 3 are to be released, preferably near the lowest part of the disc 1 when the disc is in a vertical position. In accordance with the invention the seed dislodging member 5 has a deflector or active surface which tangentially approaches the circle 20 of perforation centers where the seeds 3 are held by suction up to the point E corresponding to the end of the part of the perforate annular zone subjected to suction.

After the seeds are drawn by suction to the face of the dispenser disc 1 (forming an interior wall of the hopper) by means of partial vacuum in the suction chamber 4, the seeds being previously selected so that only one seed remains located in a given hole of the dispenser disc (see FIG. 2a) the rotation of the disc 1, e.g. anti-or counterclockwise (see arrow in FIG. 2), transports the seeds in their respective holes to the release point E where they are released owing to the cut off of suction. In the terminal zone of the circular path of movement of the seeds, while the seeds are drawn by suction against the face of the dispenser disc 1, the convex surface of the seed dislodging member 5 facing the seeds comes closer and closer to the circle 20 of perforation centers without ever reaching the same, however. The seed dislodging member 5 urges the seeds 3 to rock gradually thereby dislodging them in their holes 2 (FIG. 2c). The seeds 3 arriving at the end of the suction zone, i.e. point E, are released without impact and without being held back in their holes, thereby assuring identical release points and drop trajectories of all seeds.

Experience shows that the best results are obtained when the seed dislodging member stops substantially at the end of the suction zone located preferably near the bottom of the disc when the disc is in a vertical position (as represented in FIG. 2 and FIGS. 2a through 2d).

The seed dislodging member may be located radially inwardly of the circle 20 of perforation centers as in the embodiment of FIG. 2 (or above the circle 20 when the disc is in a vertical position) or radially outwardly of the circle 20 of perforation centers as in the embodiment of FIG. 3 and FIGS. 3a through 3d (or below the circle 20 when the disc is in vertical).

The deflector or active surface of the dislodging member may be curved as in FIGS. 2 and 3 or flat as in the embodiment of FIG. 4.

The active or deflector surface of the dislodging member may be perpendicular to the general plane of the dispenser disc 1 as in the case of the embodiments of FIGS. 2, 3 and 4, or inclined with respect to the general plane of the dispenser disc in case of the modified embodiments of FIGS. 5a and 5b.

Depending on the form of the seeds, whether they are coated or have for example, the deflection surface of the dislodging member will be either smooth or rough.

According to another embodiment of the present invention the dislodging member is a rotary cylinder rotating either in the same direction as the dispenser disc or in the opposite direction, depending on the type of seeds, and about an axis perpendicular to the general plane of the dispenser disc (FIGS. 6 and 6c). The cylindrical dislodging member comes closest to the circle of perforation centers at the point E where the suction retaining the seeds is cut off.

According to still another embodiment of the present invention the dislodging member is once again cylindrical with its axis of rotation substantially perpendicular to the general plane of the dispenser disc, the cylindrical dislodging member being rotated by contact with the dispenser disc (FIGS. 7 and 7c). The cylindrical dislodging member comes closest to the circle of perforation centers at the point the suction retaining the seeds is cut off.

The dislodging member, irrespective of its shape or form, may of course be mounted so that the distance between its deflector surface and the circle of the perforation centers is adjustable so as to vary this spacing and adjust it to the size of seeds to be sown.

What is claimed is:

1. In a one-by-one pneuatic seeder including a hopper with a rotary dispenser disc forming a wall portion thereof, said rotary dispenser disc having a series of equidistant holes arranged in an annular zone concentric with the axis of rotation of said dispenser disc, a part-circular suction chamber adapted to be connected to a source of partial vacuum and disposed along the face of said dispenser disc remote from said hopper and in alignment with said annular zone on said disc, said suction chamber having first and second ends in the direction of said holes opposite said part-circular suction chamber at any given time being subjected to the partial vacuum while said holes beyond the ends of said part-circular suction chamber are subjected to atmospheric pressure, wherein the improvement comprises seed dislodging means for gradually rocking each seed loose in its hole before each seed arrives at said second end of said suction chamber with all seeds being released for substantially identical successive drop trajectories, said seed dislodging means being disposed on the side of said dispenser disc remote from said suction chamber and arranged along and juxtaposed to the annular zone of said dispenser disc, the annular zone being relatively rotatable with respect to said dislodging means, said dislodging means gradually approaching but without crossing the circle defined by the centers of said holes in said annular zone, the portion of said dislodging means closest to said circle being disposed substantially at and opposite the second end of said partcircular suction chamber.

2. A seeder according to claim 1, wherein said dislodging means has a deflector surface which tends to urge the seeds generally radially to loosen them in their holes.

3. A seeder according to claim 2, wherein said deflector surface of said dislodging means is planar.

4. A seeder according to claim 2, wherein said deflector surface of said dislodging means is convex.

5. A seeder according to claim 1, wherein said dislodging means is entirely disposed radially inwardly of the circle defined by the centers of said holes, said deflector surface urging the seeds radially outwardly.

6. A seeder according to claim 2, wherein said dislodging means is entirely disposed radially outwardly of the circle defined by the centers of said holes, said deflector surface urging the seeds radially inwardly.

7. A seeder according to claim 2, wherein said deflector surface is perpendicular to the general plane of said dispenser disc.

8. A seeder according to claim 2, wherein said deflector surface is inclined relative to the general plane of said dispenser disc.

9. A seeder according to claim 2, wherein said deflector surface is smooth.

10. A seeder according to claim 2, wherein said deflector surface is rough.

11. A seeder according to claim 1, wherein said seed dislodging means comprises a rotary cylinder rotatable about an axis perpendicular to the general plane of said dispenser disc.

12. A seeder according to claim 1, wherein said seed dislodging means comprises a rotary cylinder rotatable about an axis inclined with respect to the general plane of said dispenser disc, said rotary cylinder being in contact with said dispenser disc and rotated thereby.

13. A seeder according to claim 2, wherein said deflector surface is adjustable with respect to said circle defined by the centers of said holes.

* * * * *

UNITED STATES PATENT OFFICE
CERTIFICATE OF CORRECTION

PATENT NO. : 4,029,235
DATED : June 14, 1977
INVENTOR(S) : Xavier Roger Grataloup It is certified that error appears in the above–identified patent and that said Letters Patent are hereby corrected as shown below:

---[30] Foreign Application Priority Data
      Mar. 27, 1975 France....75.09677---

Signed and Sealed this

Eighteenth Day of December 1979

[SEAL]

Attest:

SIDNEY A. DIAMOND

Attesting Officer     Commissioner of Patents and Trademarks